Sept. 18, 1951    H. M. PURCELL    2,568,254
FLUID PRESSURE-OPERATED ACTUATOR FOR HYDRAULIC VALVES
Filed Nov. 25, 1946    3 Sheets-Sheet 1
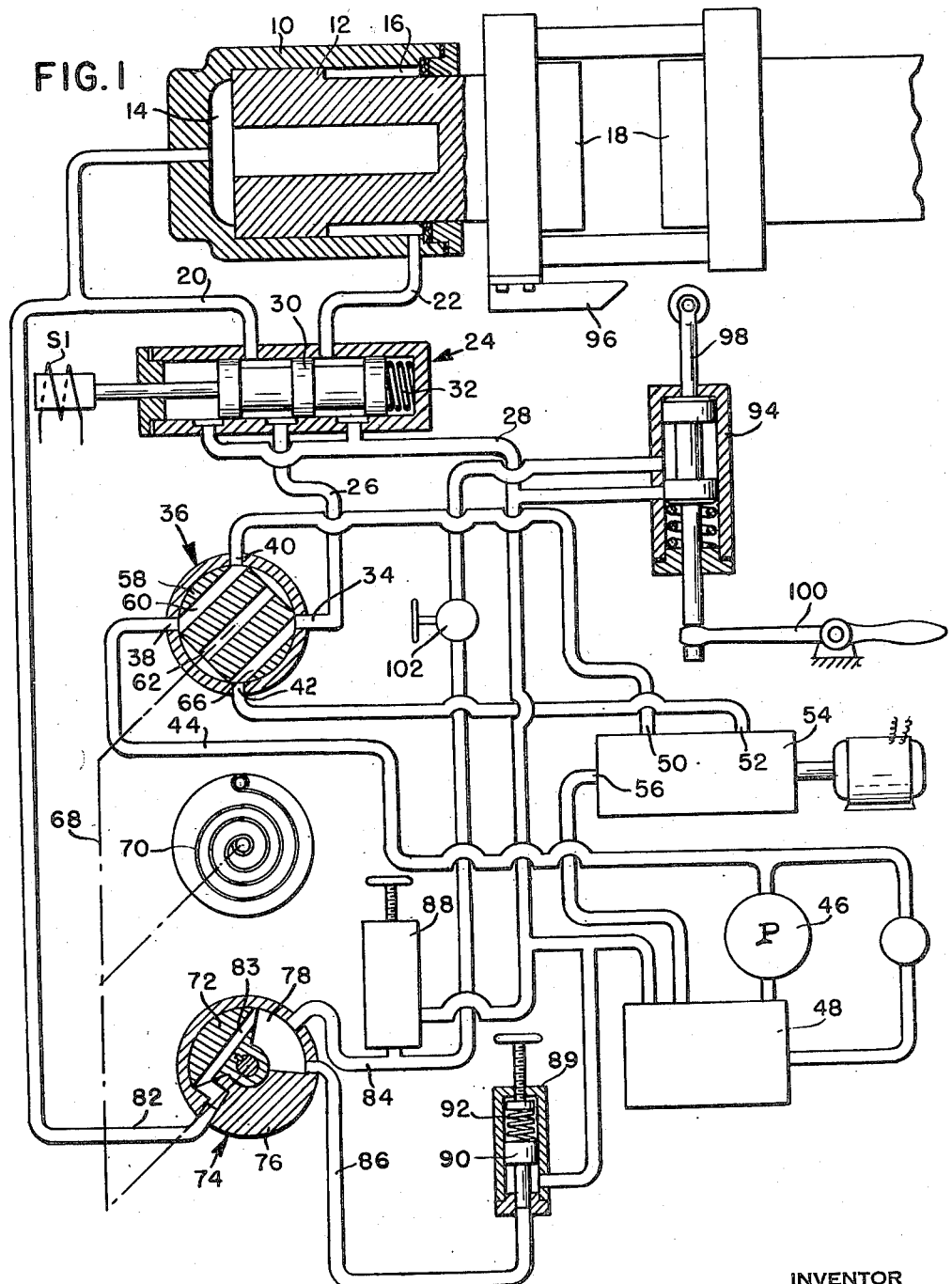
INVENTOR
HOWARD M. PURCELL
BY
Toulmin & Toulmin
ATTORNEYS

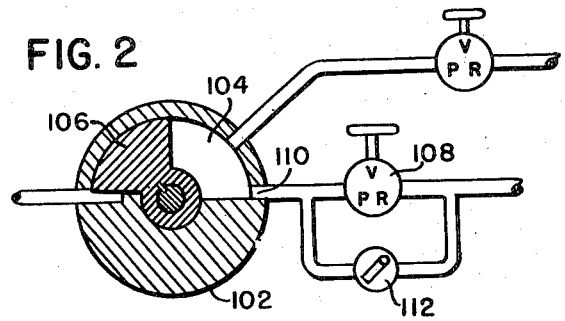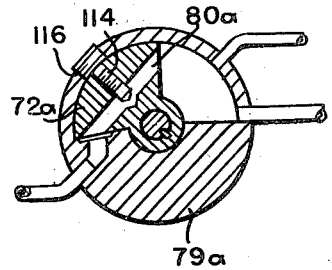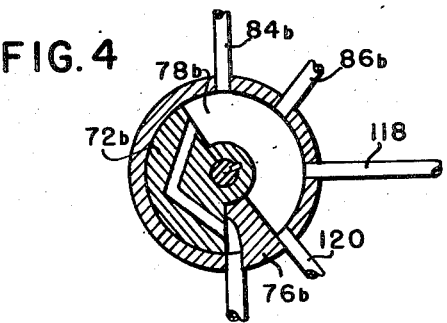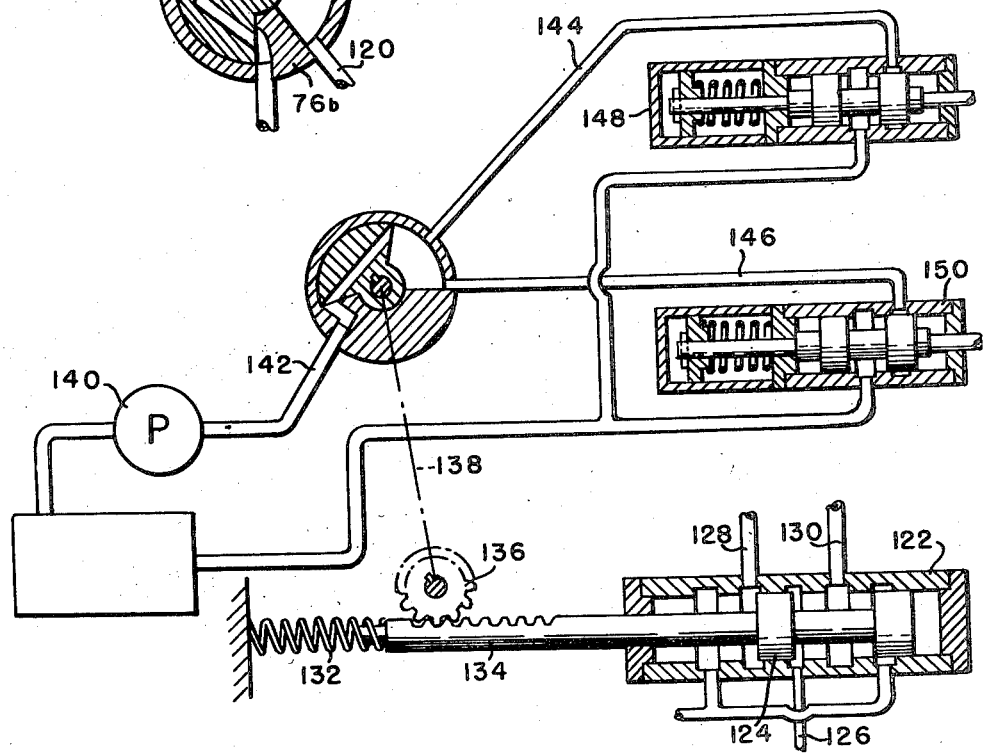

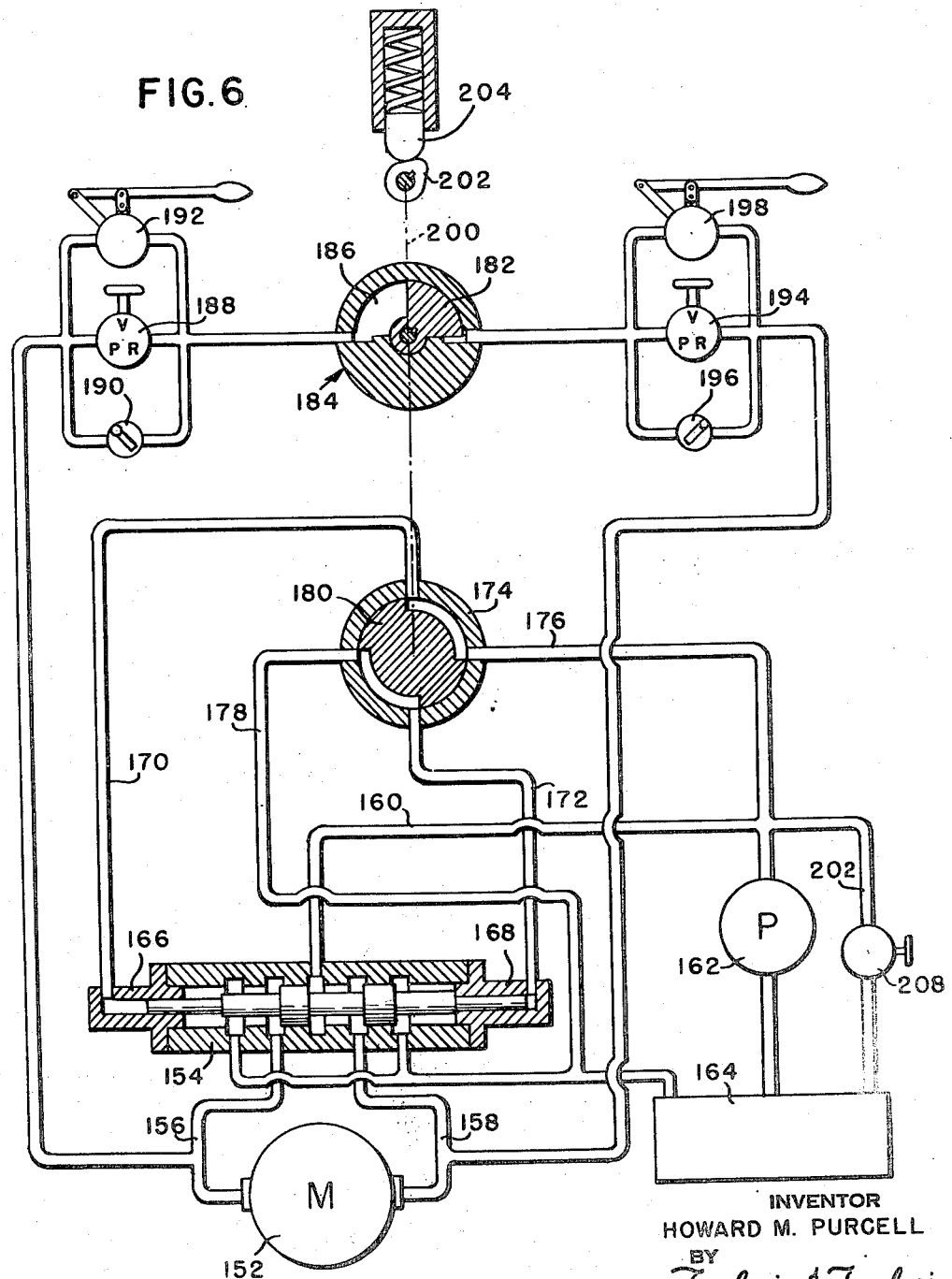

Patented Sept. 18, 1951

2,568,254

UNITED STATES PATENT OFFICE 2,568,254

FLUID PRESSURE-OPERATED ACTUATOR FOR HYDRAULIC VALVES

Howard M. Purcell, Mount Gilead, Ohio, assignor to H-P-M Development Corporation, Wilmington, Del., a corporation of Delaware Application November 25, 1946, Serial No. 712,110

6 Claims. (Cl. 121—41)

This invention concerns fluid operable apparatus, and particularly an improved type fluid motor for actuating valves and the like.

The particular object of the present invention is to provide a fluid motor which is selectively movable into a plurality of predetermined positions.

Still another object is the provision of a fluid motor for being used as a valve actuator or the like which is movable into a plurality of predetermined positions in response to predetermined pressures in the controlled circuit.

It is also an object to provide a valve actuator in connection with a circuit controlled by the said valve which is operable automatically for moving the valve into its plurality of positions in accordance with conditions in the controlled circuit or mechanism.

It is also an object to provide an improved fluid motor or valve actuator which is widely applicable for a plurality of services.

Another object is the provision of a fluid motor especially useful as a valve actuator which is simple to manufacture and construct, which is conserving of power, and which is positive in its action.

These and other objects and advantages will become more apparent upon reference to the following description taken in connection with the attached drawings in which:

Figure 1 is a diagrammatic view of a circuit having a control valve therein which is controlled by a valve actuator constructed according to this invention;

Figures 2, 3 and 4 are views showing modified constructions for the actuating motor of this invention;

Figure 5 is a diagrammatic view showing the actuator employed for shifting a reciprocating valve; and Figure 6 is a diagrammatic view of still another type of circuit adapted for being controlled by an actuator constructed according to this invention.

General arrangement

According to this invention, there is provided a fluid motor having an inlet port and one or more outlet ports. Movable between the ports is a motor member which is connected with a shaft or similar power transmitting device for exerting power on a work member.

The motor member is made selectively movable into a plurality of positions by normally equalizing the fluid pressures on the opposite sides thereof, the said sides being equal in area. Then, when one of the pressures is reduced as, for example, exhausting one of the outlet ports, the motor member moves toward the said outlet port and thereby actuates the work member to which it is connected. By arranging the motor member to cover the exhausted outlet port, the said member may be made to move into a plurality of positions from each outlet port to the next.

A biasing spring may be employed for returning the motor member to its original position after it has gone through a cycle of operations in one direction.

According to one form of the invention, the fluid pressures on the opposite sides of the motor member are equalized by a passage extending therethrough. This passage may be relatively free or restricted as desired, and there may be provided means for varying the restriction in order to accommodate the actuating device to particular circumstances. In another form of this invention, the opposite sides of the motor member are not connected, but the pressures are equalized thereacross by entrapping fluid on the discharge side thereof and relieving the fluid at a predetermined pressure.

In still another form of the invention, the motor member occupies either of two end positions, and may be employed for controlling a pilot valve which, in turn, controls an operating valve which directs pressure fluid to a motor. By making the valve actuator for the pilot valve responsive to the pressures at the ports of the motor the circuit can be arranged for full or semi-automatic operation as desired.

Structural arrangement

Referring to Figure 1, there is shown a motor at 10 which includes a ram 12 having the advancing means 14 and the retracting means 16. The ram 12 is operable for clamping a pair of work members 18, which may be mold sections, together.

Connected with the advancing means 14 by a conduit 20, and to the retracting means by a conduit 22, is a reversing valve 24. The reversing valve has an inlet conduit 26 connected therewith and an exhaust conduit 28, and a valve member 30 which connects either of the conduits 20, 22 with the pressure conduit 26 while connecting the other of the conduits 20, 22 with the exhaust conduit 28. A spring 32 continuously urges the valve 30 in a direction to connect the conduits 22 and 26 while a solenoid SI is adapted for being energized to move the valve member to connect the conduits 20 and 26.

The conduit 26 is connected to a port 34 of a rotary valve 36 which also comprises the ports 38, 40 and 42. The port 38 is connected by a conduit 44 with the discharge side of a pump 46 which is connected to draw fluid from a reservoir 48. The ports 40 and 42 are connected with the ports 50 and 52 of a fluid intensifier 54. The actual construction of the intensifier 54 forms no part of the present invention and is illustrated and described in detail in the copending application Serial No. 594,413, filed May 18, 1945, in the name of Warren R. Tucker, now Patent No. 2,486,079, granted October 25, 1949, and assigned to the same assignee as the present application. This fluid intensifier includes an exhaust port 56 and is operable to receive fluid through the ports 50 and 56 and to discharge fluid to the port 52 at reduced pressure, or to receive fluid through the port 52 and to discharge fluid to exhaust through the port 56 and fluid at intensified pressure through the port 50.

The valve 36 includes a rotary valve member 58 having the passages 60, 62 and 66 extending therethrough. With the valve member in the position shown, the passage 60 interconnects the ports 38 and 40 and the passage 66 interconnects the ports 34 and 42. When the valve member is rotated 45° clockwise from the position shown, the ports 40 and 42 are closed off while the passage 62 interconnects the ports 34 and 38. When the valve member is rotated an additional 45° clockwise from its last mentioned position, the passage 60 connects the ports 34 and 40 while the passage 66 connects the ports 38 and 42.

For shifting the valve member 58, there is a shaft indicated by the dashed line 68 which has connected therewith a torsion spring 70 which continuously urges the valve member toward its Figure 1 position. Also connected with the shaft 68 is the motor member 72 of the valve actuator 74 which also comprises a casing 76 having a chamber 78 therein within which the said motor member rotates.

The motor member 72 has equal areas on the opposite faces thereof which are connected by a passage 83 extending through the said member. One side of the motor member is exposed to pressure conducted thereto by the conduit 82 which is connected with the conduit 20 that conducts pressure fluid to the advancing means 14 of the ram 12. The chamber 78 on the opposite side of the motor member has connected therewith a pair of spaced discharge conduits 84 and 86. It will be noted that the motor member will cover the end of the conduit 84 after rotating 45°, and that after rotation of 90° the motor member will come to a halt and at the same time cover the end of the conduit 86.

Connected between the conduits 84, 86 and the reservoir 48 are the relief valves 88, 89, respectively, each of which includes a valve member 90 biased into closed position by an adjustable spring 92.

Preferably, the valve 88 connected with the conduit 84 is set for a lower pressure than the valve 89 connected with the conduit 86. Thus, when the pressure in chamber 78 reaches a predetermined value, the valve 88 will open to exhaust the said chamber whereupon the motor member 72 will rotate clockwise until the end of the conduit 84 is covered. Thereafter, a predetermined greater pressure in the chamber 78 will bring about the opening of the valve 89 which will exhaust the chamber 78 and permit the motor member 72 to rotate another 45° into its stopped position. When the pressure in the conduit 82 is reduced, the torsion spring 70 will return the motor member 72 to its Figure 1 position.

The actuation of the motor member 72 may be made responsive to the position which the ram 12 has reached by connecting between the conduit 84 and the reservoir 48 the normally closed valve 94, and by arranging a cam 96 to engage and actuate the valve member 98 of the said valve into open position. Optionally, the valve member 98 may be made manually operable by the provision of the actuating lever 100. When it is not desired to shift the motor member 72 in response to the position of the ram 12, the shut-off valve indicated at 102 may be closed.

The operation of the circuit of Figure 1 is as follows:

With the ram 12 in its Figure 1 position, the torsion spring 70 maintains the valve member 58 and the motor member 72 in their Figure 1 position. When the valve member 30 is shifted by energization of the solenoid S1 into its Figure 1 position, pressure fluid from the pump passes through the conduit 44, the valve bore 60, the port 40 and the port 50 into the fluid pressure converter 54. This brings about a supply of fluid from the port 52 of the converter at reduced pressure and increased volume which flows through the port 42 of the valve 36, the passage 66, the port 34, the conduit 26, the valve 24 and the conduit 20 to the advancing means 14.

When a predetermined pressure is built up in the advancing means this acts through the conduit 82, the passage 83 and the conduit 84 to open the relief valve 88. This causes the pressure in the right side of chamber 78 to drop and the motor member 72 to rotate clockwise until the end of the conduit 84 is covered thereby. When the conduit 84 is covered, movement of the motor member stops because pressure on the opposite sides thhereof again become equal, and any tendency for the motor member 72 to return to its original position under action of the spring 70 is prevented by reason of the positive pressure acting thereon through the conduit 82, and any such movement would result in unequal pressures upon the opposite pressure faces of the member 72, and any opening of the conduit 84 after the establishment of a predetermined maximum pressure through the conduit 82, would immediately cause the opening of the relief valve 88 to once again return the member 72 to its covering position with respect to the conduit 84. It should be understood, that after the member 72 initially closes the conduit 84, and equal pressures are established upon the opposite faces of the member, the same will have a tendency to return toward its original position under action of the spring 70, but such movement is limited to that providing for intermittent opening and closing of the conduit 84, and the member 72 will, therefore, remain in a substantially closing position with respect to the conduit 84.

The valve member 58 is now rotated to a position 45° clockwise of its Figure 1 position so that there is a direct connection from the pump discharge conduit 44 through the valve passage 62 to the inlet conduit 26 for the valve 24. Thus, the pump discharges directly into the advancing means 14 and the ram 12 continues to advance but at increased pressure and reduced speed.

When a predetermined higher pressure is developed in the advancing means 14, this acts through the conduit 82, passage 83 and conduit 86 to open the valve 89 whereupon the motor member 72 rotates through another 45° clockwise and shifts the valve member 58 another 45° clockwise. The pump is now connected by the conduit 44, the passage 66 and the port 42 with the port 52 of the fluid pressure converter 54 while the high pressure discharge port 50 of the converter is connected through the port 40 of the valve 56, the passage 60 and the port 34 with the conduit 26. Thus, the ram 12 either continues to advance into the work, or dwells on the work, with an intensified pressure acting thereon.

When the solenoid S1 is de-energized the spring 32 moves the valve member to the left to connect the conduit 20 with exhaust whereupon the pressure in the advancing means 14 is reduced and the torsion spring 70 immediately returns the motor member 72 and the valve member 58 to their Figure 1 position. As stated before, this provides for a low pressure-high volume supply of fluid from the pump through the converter 54 to the inlet of the valve 24 and the ram retracts to its Figure 1 position rapidly.

In Figure 2 an arrangement is shown wherein the actuating motor of this invention comprises a casing 102 having a chamber 104 within which is rotatable the motor member 106. In Figure 2 the motor member 106 does not have its opposite sides interconnected and in order to supply fluid to the chamber 104 when the motor member moves counterclockwise therein the relief valve 108 which is connected with the discharge port 110 of the chamber 104 is bypassed by a check valve 112 opening toward the said chamber.

The modification in Figure 3 is substantially identical to that shown in Figure 1 and bears corresponding numerals with the addition of a subscript *a*. In Figure 3 it is shown that the passage 80*a* could be variably restricted in order to control the communication between the opposite sides of the motor member 72*a* by the needle valve 114 which could be adjusted through the plugged port 116 in order to control the characteristics of the actuating device.

Figure 4 illustrates an actuating device similar to that shown in Figure 1 and bears corresponding numerals with the addition of a subscript *b*. In Figure 4, in addition to the discharge conduits 84*b* and 86*b*, there are also provided discharge conduits 118 and 120 which are spaced around the periphery of the chamber 78*b*. In Figure 4, the chamber 78*b* extends substantially farther around the casing 76*b* while the motor member 72*b* is of a width from side to side so that substantially 180° of movement thereof may be had, while in its extreme clockwise position all of the discharge ports are covered.

In Figure 5, there is shown an arrangement wherein the actuating device is connected to control a reciprocating valve. In this figure the reciprocating valve is indicated at 122 and comprises a valve member 124 which controls communication between a pressure line 126, and exhaust 127 and a pair of service lines 128 and 130.

The valve member is continuously urged toward the right by a spring 132 and has connected therewith a rack 134 which is engaged by a pinion 136 carried on the shaft 138 of the actuating device.

Figure 5 also illustrates a pilot pump 140 which is connected by a conduit 142 with the inlet of the actuating device. The outlet ports of the actuating device are connected by the conduits 144 and 146 with the inlets of the two-way valves 148 and 150, respectively. Each of the said two-way valves is normally urged closed by a spring and may be actuated into open position by any of several means as, for example, by pressure in the circuit controlled by the valve 122, manually, according to a time cycle, etc.

Figure 6 illustrates a modified arrangement of the actuator of this invention and a modified circuit controlled thereby. In Figure 6, there is a motor at 152 to which is connected the reversing valve 154 by the conduits 156 and 158. The valve 154 receives pressure through a conduit 160 from a pump 162 which draws fluid from the reservoir 164.

The valve 154 is preferably pilot operated and has the pilot chambers 166 and 168 on the ends thereof which are connected by the conduits 170 and 172, respectively, with the service ports of the four-way rotary pilot valve indicated at 174. The pilot valve 174 receives pressure fluid through a conduit 176 from the pump 162, and also has an exhaust connection 178 leading to the reservoir 164.

Connected with the rotary member 180 of the valve member 174 is the motor member 182 of the valve actuating device of this invention indicated generally at 184.

The motor member 182 rotates in a chamber 186 which is connected at its left-hand end through a relief valve 188 with the conduit 156. The relief valve is bypassed by a check valve 190 opening toward the chamber 186 and a normally closed manually operable valve 192.

The other side of the chamber 186 is similarly connected through a relief valve 194 with the conduit 158 and the said relief valve is bypassed by a check valve 196 opening toward the chamber 186 and the normally closed manually operable valve 198.

For urging the motor member 182 away from a center position, the shaft 200 thereof may carry a cam 202 which is engaged by a spring pressed member 204. As the motor member 182 passes its center position, the spring pressed member 204 and the cam 202 are operable to urge the said motor member in the same direction of movement toward its end position.

The pump 162 is bypassed by a conduit 206 that includes a valve 208 which may be moved selectively into open or closed position.

In operation, the pump 162 is started, and the valve 208 is then moved into closed position. The closing of the valve 208 causes a pressure to build up in a conduit 160 and to extend through the valve 154 to one of the conduits 156, 158. When this pressure reaches a predetermined value, the motor member 182 is automatically shifted by the opening of one of the relief valves 188, 194 whereupon the valve member 180 of the pilot valve 174 is moved to cause a supply of pressure fluid to one of the operating chambers 166, 168 and to reverse the valve 154. This reverses the motor 152 until pressure builds up in the other of the conduits 156, 158 whereupon the motor member 182 is again actuated to reverse the valve 154.

It will be apparent that semi-automatic operation of the motor 152 could be had by adjusting one of the relief valves 188, 194 to a sufficiently high pressure that it was inoperative under normal conditions. In this case, the motor could be reversed by actuation of one of the manually operable valves 192, 198.

The motor 152, when operating on full automatic cycle, could be halted by opening the valve 208 to bypass the pump delivery to the reservoir. It will be apparent that the motor 152 could be of a reciprocating type if desired and that the operation of the valve actuating mechanism would be the same.

It will be understood that this invention is susceptible to modification in order to adopt it to different usages and conditions and, accordingly, it is desired to comprehend such modifications within this invention as may fall within the scope of the appended claims.

I claim:

1. In a hydraulic actuator; a casing; a member movable in said casing from one end thereof to the other and having opposed actuating areas; a first port in one end of said casing on one side of said member; a plurality of other ports in said casing on the other side of said member; a channel hydraulically connecting said areas; means of supplying actuating fluid to said first port; and relief valves connected with said other ports and adjusted to be actuated at successively higher pressures for bringing about the movement of said member in increments from the said one end of said casing to the other.

2. In a hydraulic actuator; a casing; a member movable in said casing from one end to the other thereof and having opposed and equal actuating areas; a first port in one end of said casing on one side of said member; a plurality of other ports in said casing on the other side of said member and spaced apart in the direction of movement of said member; channel means hydraulically connecting said areas; means to supply actuating fluid to said first port; and means responsive to fluid pressures on the said other side of said member and movable to connect said other ports successively with exhaust for bringing about the movement of said member in increments from the said one end of said casing to the other.

3. In a hydraulic actuator; a casing; a member movable in said casing from one end to the other thereof and having opposed and equal actuating areas; a first port in one end of said casing on one side of said member; a plurality of other ports in said casing on the other side of said member and spaced part in the direction of movement of said member; channel means hydraulically connecting said areas; means to supply actuating fluid to said first port; and a relief valve connected with each of said other ports and operable in response to a predetermined pressure acting therein to exhaust the said port thereby to bring about the movement of said member into position to cover the said port, the relief valves being adjustable so that the said other port nearest the said member is exhausted first and the said other port furthest from said member is exhausted last.

4. In a hydraulic actuator; a cylindrical casing formed with an internal arcuate chamber; a member mounted in said casing for limited oscillatory movement within the chamber thereof, said member being formed with a pair of opposed equal area pressure faces; a first port in said casing communicating with the chamber thereof on one side; other ports in said casing communicating with the chamber thereof at its opposite side; means to connect said first port with a source of positive fluid pressure; and means connected with each of said other ports and responsive to different pressures within the chamber of said casing at the side adjacent said other ports for successively connecting said other ports to exhaust to permit movement of said member in increments from one end of said chamber to the other in response to positive fluid pressure applied through said first port.

5. In a hydraulic actuator; a casing; a member movable in said casing from one end to the other thereof and having opposed areas; a first port in one end of said casing on one side of said member; a plurality of other ports in said casing on the other side of said member; means to connect said first port with a source of pressure fluid; pressure-responsive means connected with each of said other ports and with exhaust and operable in response to fluid pressures on the said other side of said member to connect the said other side of said member to exhaust and thereby to bring about the movement of said member in increments from the said one end of said casing to the other; and means urging said member to move in said casing to a position adjacent said first port.

6. In a hydraulic actuator; a casing; a member movable in said casing from one end thereof to the other and having opposed actuating areas; a first port in one end of said casing communicating with one of the actuating areas of said member; a plurality of other ports in said casing communicating with the opposite actuating area of said member; channel means in said member hydraulically connecting the opposed actuating areas thereof; means for variably restricting said channel means; means for supplying pressure fluid to said first port; and relief valves connected with said other ports and with exhaust and adjusted to be actuated at successively higher pressures for bringing about the movement of said member in increments from the said one end of said casing to the other.

HOWARD M. PURCELL.

REFERENCES CITED

The following references are of record in the file of this patent:

UNITED STATES PATENTS

| Number | Name | Date |
|---|---|---|
| 1,047,146 | Balloco | Dec. 17, 1912 |
| 1,257,369 | Lower | Feb. 26, 1918 |
| 1,509,160 | Mahony | Sept. 23, 1924 |
| 1,753,364 | Corcoran | Apr. 8, 1930 |
| 1,897,230 | Bowen | Feb. 14, 1933 |
| 1,905,077 | Walker | Apr. 25, 1933 |
| 1,911,132 | Macomber | May 23, 1933 |
| 1,970,999 | Ferris | Aug. 21, 1934 |
| 2,148,695 | Ishibashi | Feb. 28, 1939 |
| 2,197,867 | Klement | Apr. 23, 1940 |
| 2,351,872 | Parker | June 20, 1944 |
| 2,375,204 | Baker | May 8, 1945 |
| 2,398,997 | Berry | Apr. 23, 1946 |
| 2,408,303 | Ernst | Sept. 24, 1946 |
| 2,481,426 | Hull | Sept. 6, 1949 |